June 25, 1963
T. S. MARTIN
3,095,497
ELECTRIC HOT AIR FURNACE
Filed May 8, 1962
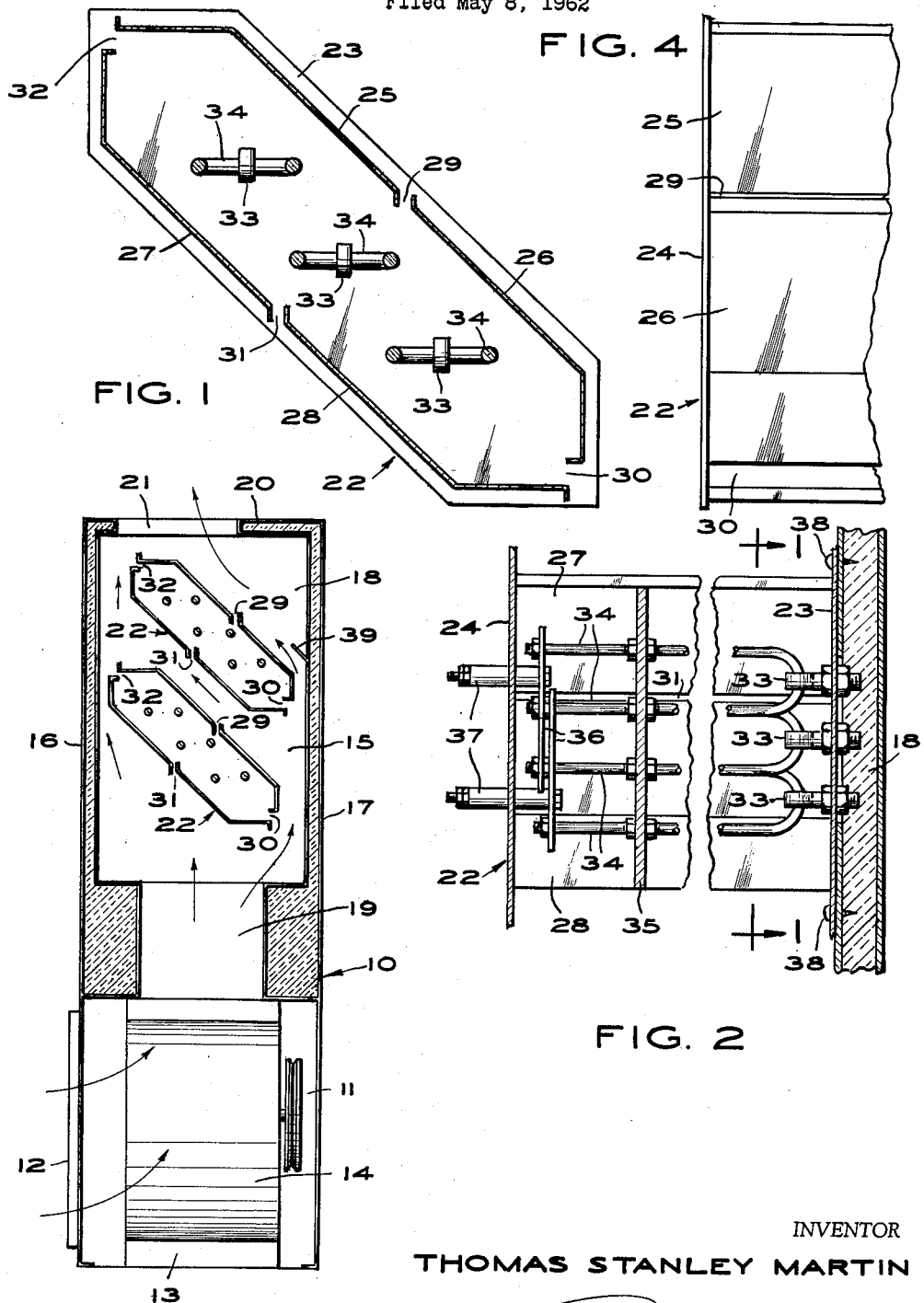
FIG. 4
FIG. 1
FIG. 2
FIG. 3
INVENTOR
THOMAS STANLEY MARTIN
BY
ATTORNEY

United States Patent Office 3,095,497
Patented June 25, 1963

3,095,497
ELECTRIC HOT AIR FURNACE
Thomas Stanley Martin, 1068 Dunsmure Ave.,
Hamilton, Ontario, Canada
Filed May 8, 1962, Ser. No. 193,195
2 Claims. (Cl. 219—39)

The present invention relates to a hot air furnace and it consists in the combinations, constructions and arrangements of parts herein described and claimed.

Generally there is provided a hot air furnace consisting of a vertically extending housing in the lower end of which there is provided an air inlet opening and in the upper portion of which there is provided a novel arrangement of heating elements. Several units of heating elements may be provided and each consists of an angularly extending metal shell having a plurality of novelly arranged air passages therein. The apparatus is such that the electrical heating units contained in each of the shells may operate at white heat as distinguished from black heat in the conventional electrically operated hot air furnaces. Various novel features are contained in the invention.

It is accordingly an object of the invention to provide a novel electrically operated hot air furnace.

Another object of the invention is to provide a furnace of the character set forth which is simple in construction, inexpensive to manufacture and yet effective and efficient in use.

Still another object of the invention is to provide, in a furnace of the character set forth, a novel heating unit forming a part of the invention.

Still another object of the invention is to provide, in a furnace of the character set forth, a novel arrangement of heat unit-enclosing shells forming a part of the invention.

A still further object of the invention is to provide, in a furnace of the character set forth, a novel heat unit enclosing shell having a novel arrangement of air passageways therein.

Other and further objects of the invention will become apparent from a reading of the following specification taken in conjunction with the drawing, in which:

FIGURE 1 is a vertical sectional view, taken substantially along line 1—1 of FIGURE 2, illustrating a heating unit in accordance with the present invention, FIGURE 2 is a horizontal sectional view with certain parts removed and partly broken away of the device illustrated in FIGURE 1, FIGURE 3 is a vertical sectional view of a hot air furnace embodying the present invention, and FIGURE 4 is a fragmentary side elevational view of FIGURE 1.

Referring more particularly to the drawing, there is shown therein an electrically operated hot air furnace comprising a vertically extending housing generally indicated at 10 and having a lower chamber 11 provided with an air inlet opening 12 at one side thereof and having a bottom wall 13 upon which is mounted a conventional electrically operated blower fan 14.

In the upper portion of the furnace 10 there is provided a chamber 15 partially defined by side walls 16 and 17 and a back wall 18. A vertical passageway 19 interconnects the chamber 15 with the chamber 11 and the structure is provided with a top wall 20 having an outlet opening 21 for connection with the usual plenum.

Upon the back wall 18 in the chamber 15 there is provided a plurality (in this case two) of heating units each generally indicated at 22.

Each of the units 22 is provided with a vertically extending back cover 23 and a front cover 24, these covers being formed of sheet metal or the like but preferably of stainless steel in order to withstand high temperatures. The front and back walls or plates 23 and 24 are interconnected by a pair of upper shield members 25 and 26 and a pair of lower shield members 27 and 28, it being apparent from an observation of FIGURE 1 that the plates 25 and 28 are identical as are the plates 26 and 27. The plates 25 to 28, inclusive, interconnect the plates 23 and 24 adjacent the peripheral edges of the latter and are spaced from one another to provide openings or slots 29, 30, 31 and 32.

Eye bolts 33 connected to the plate 23 act to support one end of a series of heating elements 34. The other ends of the heating elements 34 extend through a vertical support member 35 and are then interconnected by bus bars 36 which, in turn, are connected to insulated connectors 37 which extend through the front plate 24. A plurality of self-tapping screws 38 are utilized to mount the shells 22 upon the rear wall 18 by fastening the rear plate 23 thereto.

In operation, it will be apparent that air will be drawn into the furnace 10 through the opening 12 and thence forced upwardly through the passageway 19 by means of the fan 14 following generally in the path of the arrows shown in FIGURE 3. During the passage of the air through the chamber 18 portions of the same will enter through the slots 30 and 31 and be expelled through the slots 29 and 32 while the remainder of the air will encircle the units 22. It will also be apparent that some air will move between the two units illustrated. A baffle 39 is provided on the side wall 17 to assist in directing a portion of the air over the top of the upper shell 22 shown in FIGURE 3. Hence it will be seen that the heating elements 34 may be operated at white heat and thus efficiently warm a great deal of air passing through the furnace.

While but one form of the invention has been shown and described herein, it will be readily apparent to those skilled in the art that many minor modifications may be made without departing from the spirit of the invention or the scope of the appended claims.

What is claimed is:

1. An air furnace of the character described comprising a vertical housing having a lower chamber and a vertically extending upper chamber therein, an air inlet passage in said housing for said lower chamber, a blower mounted in said lower chamber for impelling air into said upper chamber, said housing having a passage interconnecting said upper and lower chambers, said housing having an air outlet opening in the upper end thereof for said upper chamber, a plurality of groups of vertically spaced electrical heating units mounted in said upper chamber, each group of heating units extending angularly upwardly from points adjacent one of the side walls of said upper chamber to points adjacent the other of the side walls of said upper chamber, a shell encompassing each of said groups of heating units, said shells each comprising a vertically extending rear plate, a vertically extending front plate spaced from and parallel to said rear plate, and a plurality of horizontally extending shield members interconnecting the peripheral edge portions of related front and rear plates and having their ends in spaced relation to provide air inlet openings in the lower and under sides of each of said shells, and air outlet slots in the upper and top sides of each of said shells.

2. A furnace as defined in claim 1 wherein the plates and shields of said shells are made of stainless steel.

References Cited in the file of this patent

UNITED STATES PATENTS

| | | |
|---|---|---|
| 1,716,791 | Ness | June 11, 1929 |
| 2,458,268 | Hinds | Jan. 4, 1949 |
| 2,459,986 | Worden | Jan. 25, 1949 |
| 2,623,154 | Suhr | Dec. 23, 1952 |
| 2,676,238 | Coates | Apr. 20, 1954 |
| 2,724,044 | Campbell | Nov. 15, 1955 |

FOREIGN PATENTS

| | | |
|---|---|---|
| 437,996 | Great Britain | Nov. 8, 1935 |